(12) United States Patent
Chung et al.

(10) Patent No.: US 7,417,691 B2
(45) Date of Patent: Aug. 26, 2008

(54) DISPLAY DEVICE HAVING A TRANSISTOR ELECTRODE OVERLAPPING AND DISPOSED WITHIN THE BOUNDARIES OF A CAPACITOR ELECTRODE

(75) Inventors: Chao-Chun Chung, Tainan (TW); Yu-Chien Kao, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 376 days.

(21) Appl. No.: 11/224,438

(22) Filed: Sep. 12, 2005

(65) Prior Publication Data

US 2006/0061700 A1 Mar. 23, 2006

(30) Foreign Application Priority Data

Sep. 13, 2004 (TW) .............................. 93127677 A (51) Int. Cl.
*G02F 1/1343* (2006.01)
(52) U.S. Cl. .......................................... 349/38; 349/39
(58) Field of Classification Search .................. 349/38, 349/39
See application file for complete search history.

(56) References Cited

U.S. PATENT DOCUMENTS

| 5,459,596 | A | | 10/1995 | Ueda et al. |
| 5,517,342 | A | | 5/1996 | Kim et al. |
| 5,686,977 | A | | 11/1997 | Kim et al. |
| 5,796,448 | A | * | 8/1998 | Kim ............................ 349/39 |
| 6,307,216 | B1 | | 10/2001 | Huh et al. |
| 6,900,871 | B1 | * | 5/2005 | Song et al. ................... 349/139 |

* cited by examiner

*Primary Examiner*—David C. Nelms
*Assistant Examiner*—John Heyman
(74) *Attorney, Agent, or Firm*—Trop, Pruner & Hu, P.C.

(57) ABSTRACT

A display device includes a pixel region, a pixel electrode in the pixel region, and a capacitor electrode having at least first and second segments, where the first segment extends along a first direction with respect to the pixel electrode, and the second segment extends along a second direction with respect to the pixel electrode, and the first direction is angled with respect to the second direction. A transistor has an electrode with an extending portion overlapping a portion of the pixel electrode and a substantial portion of at least one of the first and second segments of the capacitor electrode. The transistor electrode and the pixel electrode together provide a counter electrode to the capacitor electrode.

44 Claims, 9 Drawing Sheets

FIG. 9

DISPLAY DEVICE HAVING A TRANSISTOR ELECTRODE OVERLAPPING AND DISPOSED WITHIN THE BOUNDARIES OF A CAPACITOR ELECTRODE

TECHNICAL FIELD

This invention relates generally to a display device having a transistor with an electrode that overlaps a capacitor electrode.

BACKGROUND

Various types of flat panel display devices are available, including LCD (liquid crystal display), PDP (plasma display panel), ELD (electroluminescent display), and VFD (vacuum fluorescent display). Of these flat panel display devices, the LCD has been the most actively researched recently because of relatively good picture quality and low power consumption.

An LCD has an array of pixels associated with respective thin film transistors (TFTs) that control the application of pixel voltage to respective pixels. Unlike conventional monolithic transistors that are formed in a semiconductor substrate, TFTs are fabricated by stacking several thin films on a substrate. Therefore, TFTs have a simple and easy-to-fabricate configuration as compared to the monolithic transistors. As a result, TFTs have been in widespread use, including for example, as switching elements in an electronic device such as an LCD.

To obtain uniformity of an image displayed on the TFT LCD, it is desirable that the voltage of a signal applied through a data line to each pixel of the LCD during a writing operation be held constant for a certain time period until a subsequent signal is received. Therefore, a storage capacitor is usually formed in each pixel region to improve the image quality of the display.

Figure 1:
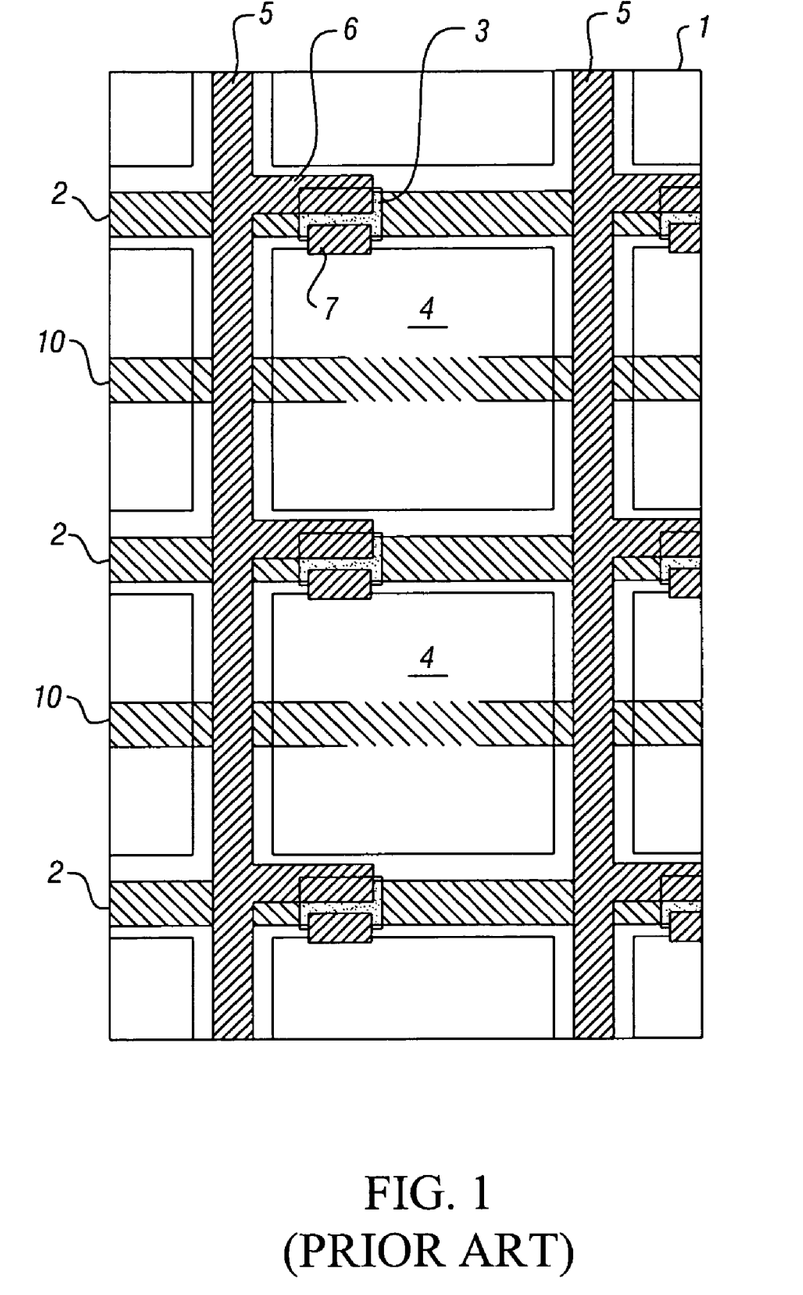
FIG. 1 shows a pixel layout of a conventional TFT (thin film transistor) LCD (liquid crystal display)

FIG. 1 shows a pixel layout of a portion of a conventional TFT LCD, which includes gate or scan lines 2 and data lines 5 arranged in a matrix on a substrate 1. Pixel regions are defined as regions bounded by adjacent gate lines and data lines. Each pixel region is provided with a pixel electrode 4 connected to a semiconductor layer 3 via a drain electrode 7. The semiconductor layer 3 is formed on the gate line 2 and connected to the data line 5 via a source electrode 6. The source electrode, drain electrode, and semiconductor layer are part of a TFT. Also, a capacitor electrode 10 that is parallel to the gate line 2 is formed in each pixel region. Because the capacitor electrode 10 is typically formed of an opaque electrically conductive metal such as aluminum, chromium, tantalum or molybdenum, the aperture ratio (i.e., light transmittance ratio) of the LCD is reduced by overlapping the capacitor electrode and pixel electrode in the manner depicted in FIG. 1. Furthermore, the pixel electrode 4 is typically designed to be close to the respective data line 5 to achieve a better aperture ratio. However, arranging the pixel electrode 4 too close to the respective data line 5 may cause capacitive coupling (crosstalk), which, in turn, leads to the phenomenon of partial darkening in the corresponding display pixel.

In addition, to realize the coloration of the LCD, a color filter substrate (not shown) is provided that has a light shielding matrix (e.g., black matrix (BM)), color filters for displaying colors, and a transparent electrode as a common electrode. Since it is very difficult to accurately align the color filter substrate with the substrate 1, the light shielding matrix and the pixel electrodes should overlap by some amount to provide for manufacturing process tolerance to prevent misalignment, which may cause light leakage. However, this requires widening the light shielding matrix thereby reducing the aperture ratio of the LCD.

BRIEF DESCRIPTION OF THE DRAWINGS

Some embodiments of the invention are described with reference to the following figures.

DETAILED DESCRIPTION

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

Generally, according to some embodiments, a display device (e.g., a liquid crystal display device) according to some embodiments includes a liquid crystal layer sandwiched between first and second substrates, and a plurality of gate lines and data lines on the first substrate. The gate lines and the data lines are arranged to form a matrix of pixel regions. Each pixel region is provided with a pixel electrode, a capacitor electrode and a thin film transistor. The pixel electrode has first sides adjacent to the data lines and second sides adjacent to the gate lines. The drain electrode of the thin film transistor has a segment overlapping a corresponding capacitor electrode and extending along first side or second side of the corresponding pixel electrode.

The second substrate is provided with a light-shielding matrix (such as black matrix (BM)), color filters and a common electrode. The first substrate is referred to as a TFT substrate, while the second substrate is referred to as a color filter (CF) substrate.

Figure 2:
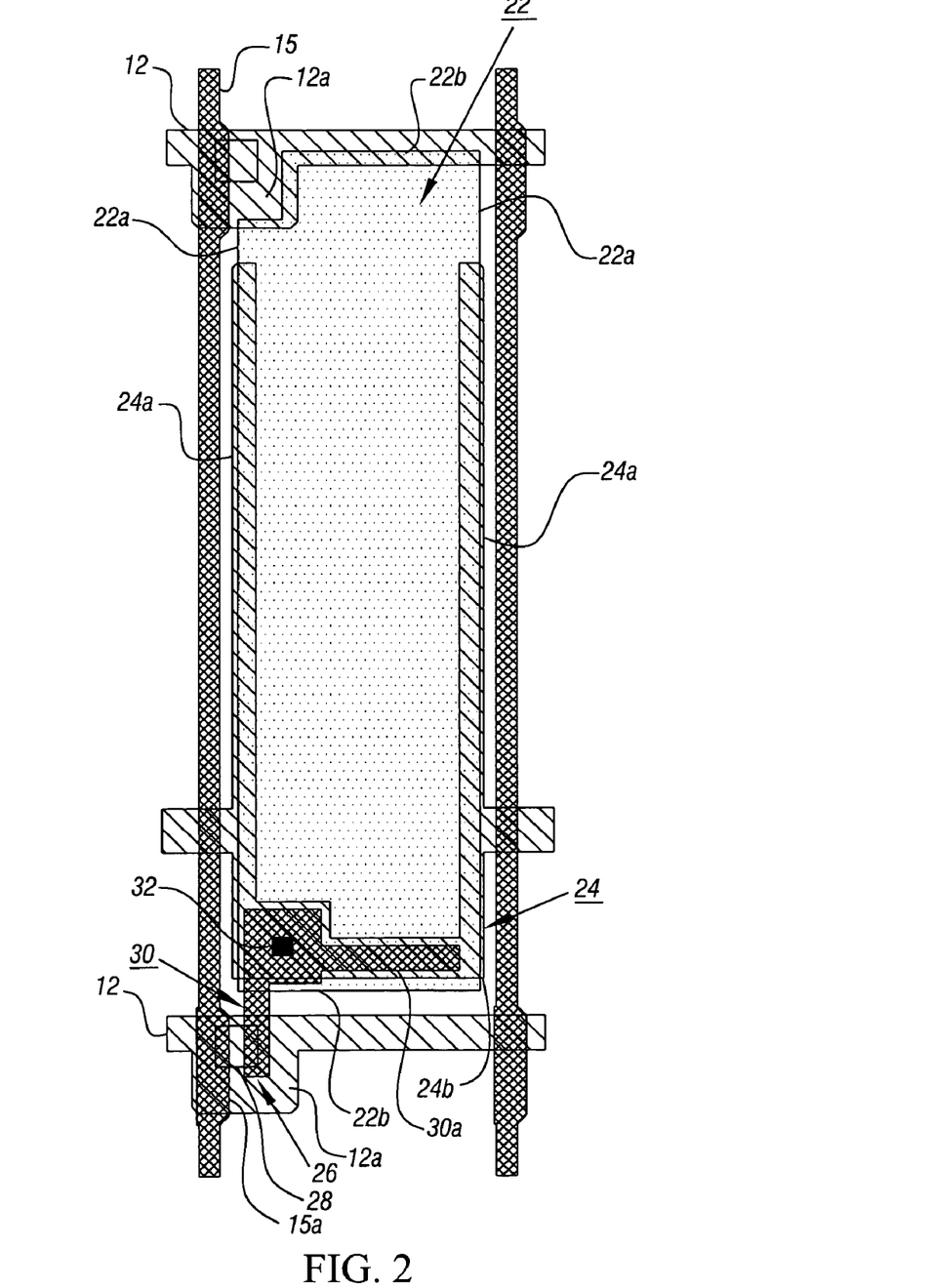
FIGS. 2-4 depict the pixel layout of a portion of an LCD according to an embodiment of the present invention.
Figure 3:
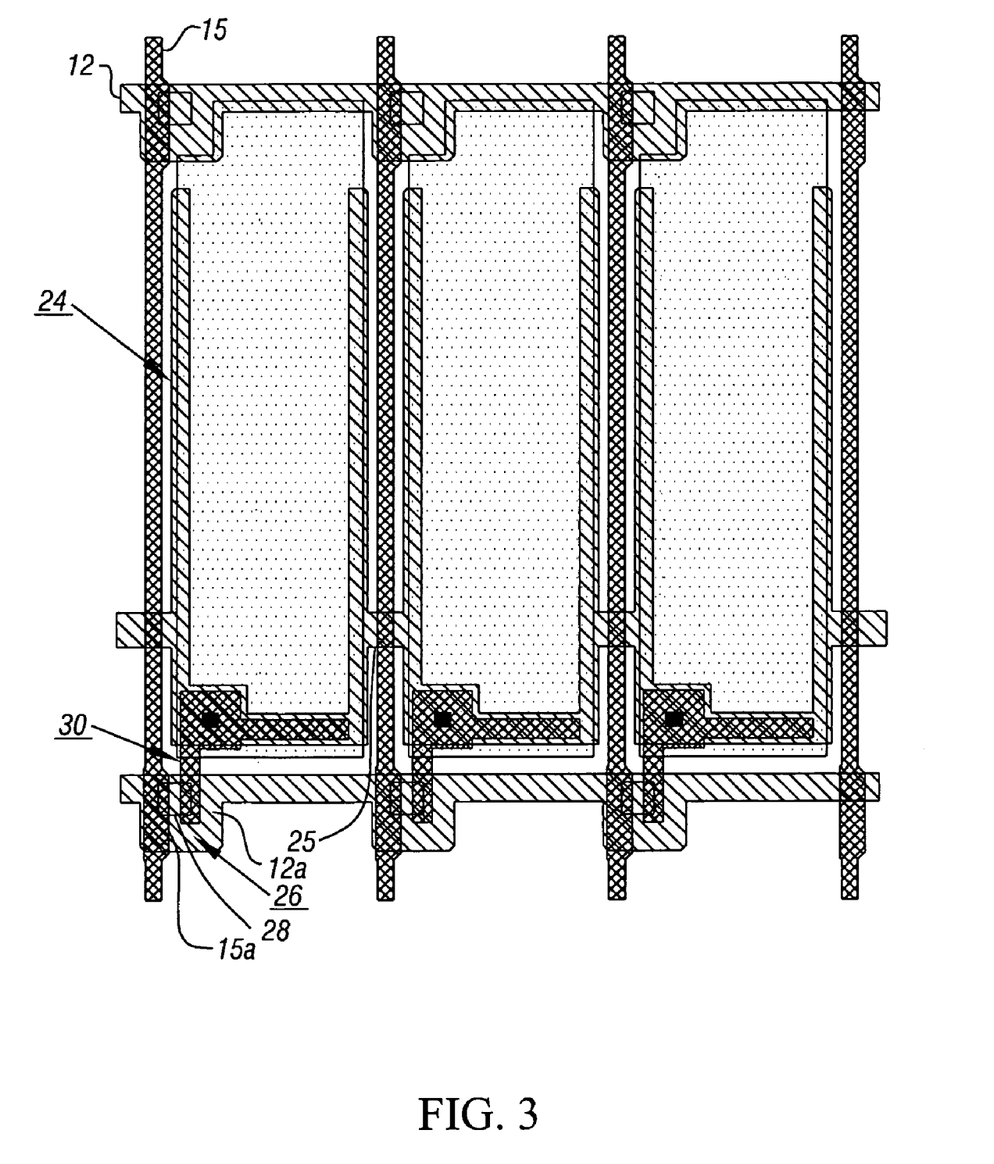
Figure 4:
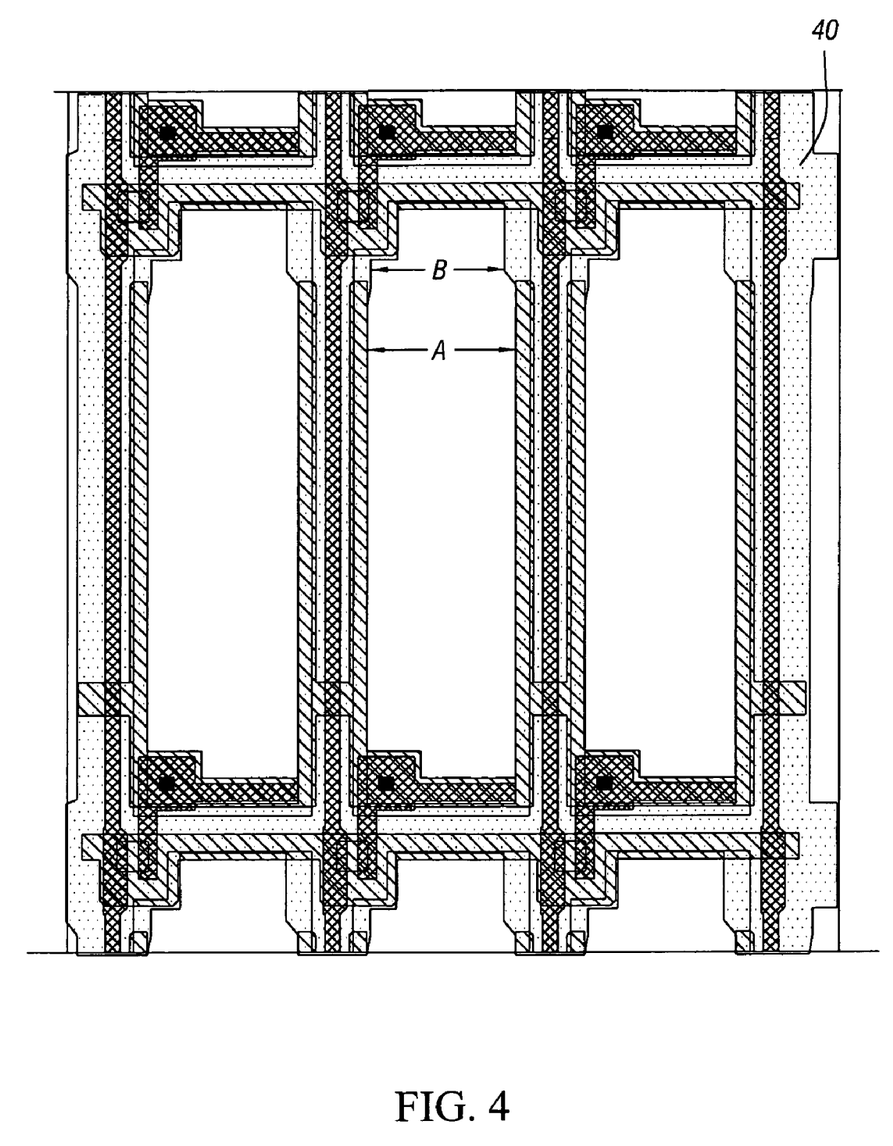

FIGS. 2-4 show a pixel layout of an LCD according to an embodiment of the present invention. The LCD includes a liquid crystal layer (not shown) sandwiched between a TFT (thin film transistor) substrate and CF (color filter) substrate. As shown, a plurality of gate or scan lines 12 and data lines 15 are arranged as a matrix on the first substrate. The gate lines 12 and the data lines 15 are arranged to form a matrix of pixel regions. These gate lines 12 and data lines 15 are insulated from each other through a gate insulating layer. Each pixel region is a region that is surrounded by two adjacent gate lines 12 and two adjacent data lines 15. Each pixel region includes a pixel electrode 22 (which is darkened in FIGS. 2 and 3 for better viewing), a capacitor electrode 24 and a thin film transistor (TFT) 26. The pixel electrode 22 has first sides 22a substantially parallel to the data lines 15 and second sides 22b substantially parallel to the gate lines 12. FIG. 2 shows one pixel region, whereas FIG. 3 shows three successive pixel regions.

The TFT 26 includes a gate electrode 12a (that extends from a respective gate line 12), a semiconductor layer 28, a source electrode 15a (that extends from a respective data line 15), and a drain electrode 30. As used here, the term "source" and "drain" of a TFT are interchangeable.

An interconnecting portion 32 is provided in each pixel region for electrically coupling the drain electrode 30 of the TFT 26 to the pixel electrode 22. The interconnecting portion 32 may include a via hole, and the connection through the via hole may be formed by a metal (or other electrically conductive material) layer, e.g., ITO, used to form the pixel electrode 22. When a scanning signal is activated on a respective gate line 12, the TFT 26 is turned on to provide the data signal (on a respective data line 15) through the TFT 26 to the pixel electrode 22.

Referring to FIG. 4, the second substrate is provided with a light-shielding layer or matrix (such as black matrix (BM) 40 which is darkened in FIG. 4 for better viewing), color filters (not shown) for displaying colors, and a transparent electrode such as an ITO electrode (not shown) as a common electrode.

As depicted in the FIG. 2 embodiment, each capacitor electrode 24 is generally in the form of a U-shape and has two side portions 24a interconnected by a central portion 24b. The two side portions 24a of the capacitor electrode 24 respectively overlap respective first sides 22a of a pixel electrode 22, and the central portion 24b of the capacitor electrode extends along a corresponding second side 22b of the pixel electrode 22.

More generally, the capacitor electrode 24 has at least two segments, where a first segment (e.g., side portion 24a) extends along a first direction with respect to the pixel electrode 22 (e.g., along the direction of side portion 22a that is generally parallel to the data line 15), and where a second segment extends along a second direction with respect to the pixel electrode 22 (e.g., along the direction of side portion 22b that is generally parallel to the gate line 12). The first direction and second direction are angled with respect to each other. In FIG. 2, the first direction and second direction are generally at right angles, although different angles can be used in different embodiments. In the implementation of FIG. 2, the capacitor electrode 24 has three segments that form the general U-shape.

In some embodiments, the capacitor electrode 24 is formed simultaneously with the gate line 12 and the gate electrode 12a by patterning a gate metal layer. Since the gate metal layer is typically formed from an opaque conductive metal such as aluminum, chromium, tantalum or molybdenum, the two side portions 24a of the capacitor electrode 24 can be used as an auxiliary light shielding layer for shielding the light leakage due to alignment error in mass production. Furthermore, the light shielding matrix 40 and the capacitor electrode 24 may overlap a predetermined distance to provide a process tolerance window whereby the light shielding layer 40 of the second substrate can be formed to be narrower at locations adjacent the two side portions 24a of the capacitor electrode 24. Since the possible light leakage due to alignment error can be shielded by the two side portions 24a of the generally U-shaped capacitor electrode, the light shielding layer on the color filter substrate can be formed to be narrower to substantially increase the aperture ratio of the LCD.

As shown in FIG. 4, the width A of the light transmissive area between the two side portions 24a of the capacitor electrode 24 is larger than the width B of the light transmissive area without provision of the capacitor electrode 24. Therefore, the provision of the capacitor electrode 24 according to some embodiments of the present invention can substantially increase the aperture ratio of the LCD such that the light transmittance ratio and the light utilization rate can be increased.

As shown in FIG. 3, each capacitor electrode 24 is connected to both neighboring capacitor electrodes 24 by respective connecting portions 25. Each connecting portion 25 that interconnects adjacent side portions 24a of neighboring capacitor electrodes 24 extends generally parallel to the gate lines 12. The capacitor electrode 24 is spaced apart from the nearest gate line 12 by a selected distance and driven independently of the gate line 12 to a voltage potential.

Referring to FIG. 2 again, the drain electrode 30 of the TFT 26 has an extending portion 30a extending along a corresponding second side 22b of the pixel electrode 22 such that the extending portion 30a overlaps a portion of the pixel electrode 22. The length of the extending portion 30a of the drain electrode 30 is substantially equal to that of the corresponding second side 22b of the pixel electrode 22. Note that the extending portion 30a of the drain electrode 30 overlaps a substantial portion of at least one of the segments of the capacitor electrode 24 (in the FIG. 2 implementation the extending portion 30a overlaps a substantial portion of the central portion 24b of the capacitor electrode 24. The extending portion 30a overlapping a substantial portion of at least one segment of the capacitor electrode 24 enables the provision of a substantial supplemental or extra capacitance to enhance the storage capacitance that is electrically connected to each pixel electrode. The extending portion 30a overlapping a "substantial" portion of at least one segment of the capacitor electrode 24 means that the extending portion 30a overlaps greater than 50% of the segment.

Since the drain electrode 30 is electrically coupled to the pixel electrode 22, the extending portion 30a of the drain electrode 30 and the pixel electrode 22 together function as a counter electrode to the capacitor electrode 24, thereby providing extra or supplemental storage capacitance. In other words, the presence of the extending portion 30a provides for extra storage capacitance when compared to the storage capacitance provided by just the overlapping portions of the capacitor electrode 24 and pixel electrode 22.

In the LCD according to some embodiments, the extending portion 30a of the drain electrode 30 and the pixel electrode 22 form a first storage capacitance with the capacitor electrode 24. In one embodiment, in each of the pixel regions, the gate line 12 and the gate electrode 12a respectively have a portion overlapping a corresponding second side 22b of the pixel electrode 22 such that the overlapping portion therebetween forms a second extra or supplemental storage capacitance with the pixel electrode thereby further providing extra storage capacitance.

Furthermore, since the gate metal layer is typically formed from an opaque conductive metal as mentioned above, the gate line 12 and the central portion 24b of the capacitor electrode 24 can be used as an auxiliary light shielding layer for shielding the light leakage near respective second sides 22b of the pixel electrode 22. Consequently, the light shielding layer 40 on the CF substrate can be made narrower at locations near the second sides 22b of the pixel electrode 22, which further leads to increased light transmission area of each pixel region.

In addition, although the drain electrode 30 is formed from an opaque, electrically conductive metal in some implementations, the light transmissive area is not substantially reduced by the provision of the extending portion 30a of the drain electrode 30 since the extending portion 30a and the central portion 24b of the capacitor electrode 24 overlap each other, i.e., vertically projected on the same area of the substrate surface. It follows, therefore, that the provision of the central portion 24b of the capacitor electrode 24 according to some embodiments allows for increased aperture ratio of the LCD while also achieving increased storage capacitance for the corresponding pixel region.

Figure 5:
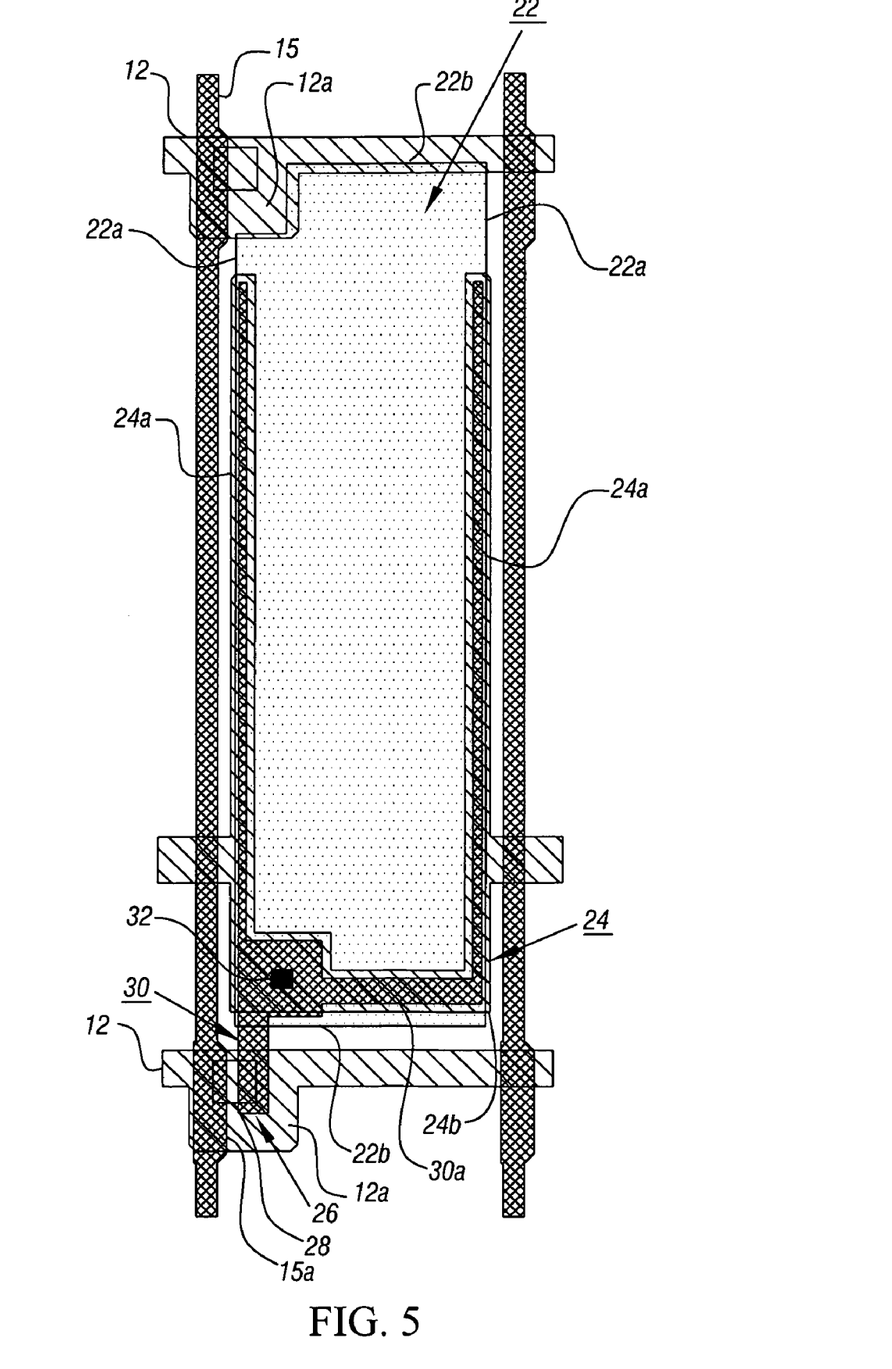
FIG. 5-9 depict pixel layouts of LCDs according to other embodiments of the present invention.

FIG. 5 shows a pixel layout of an LCD according to another embodiment. The LCD of FIG. 5 is substantially identical to the LCD of FIGS. 2-4 with the exception that the extending portion 30a of the drain electrode is generally U-shaped having a bottom section (adjacent the central portion 24b of the capacitor electrode 24) and two side sections (adjacent respective side portions 24a of the capacitor electrode 24). In fact, the side sections of the extending portion 30a overlap respective side portions 24a of the capacitor electrode 24, and the bottom section of the extending portion 30a overlaps the central portion 24b of the capacitor electrode 24. The increased area of overlap between the extending portion 30a of the drain electrode 30 and the capacitor electrode 24 leads to increased extra storage capacitance.

Figure 6:
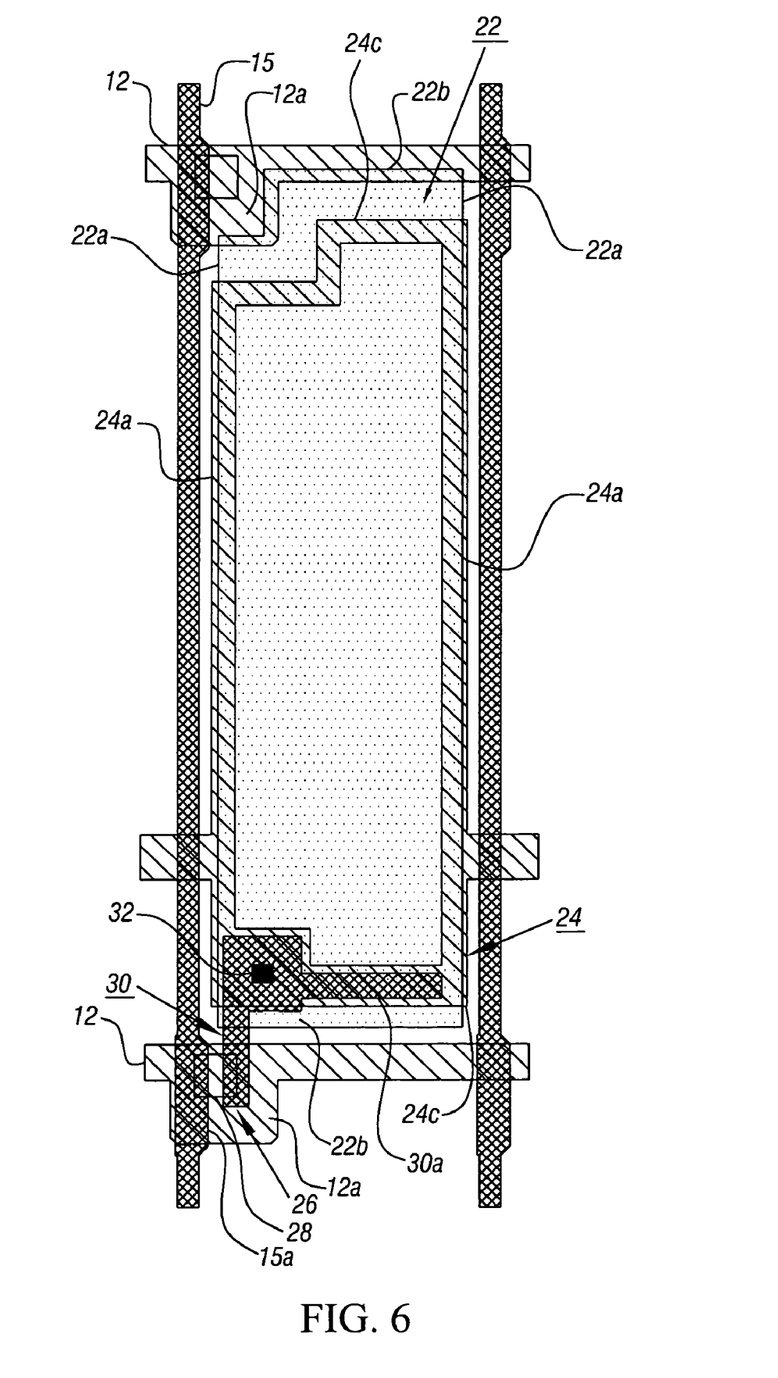

FIG. 6 shows the pixel layout of an LCD according to yet another embodiment. The LCD of FIG. 6 is substantially identical to the LCD of FIGS. 2-4 with the exception that the capacitor electrode 24 is in the form of a polygon having two side portions 24a interconnected by the two connecting portions 24c. Instead of a polygon, the capacitor electrode 24 can have other closed loop shapes, such as an elliptical, circular, oval or other shape. The capacitor electrode 24 of FIG. 6 has four segments (two side portions 24a and connecting portions 24c) to provide greater amount of overlap with the pixel electrode 22 to achieve a larger storage capacitance.

Figure 7:
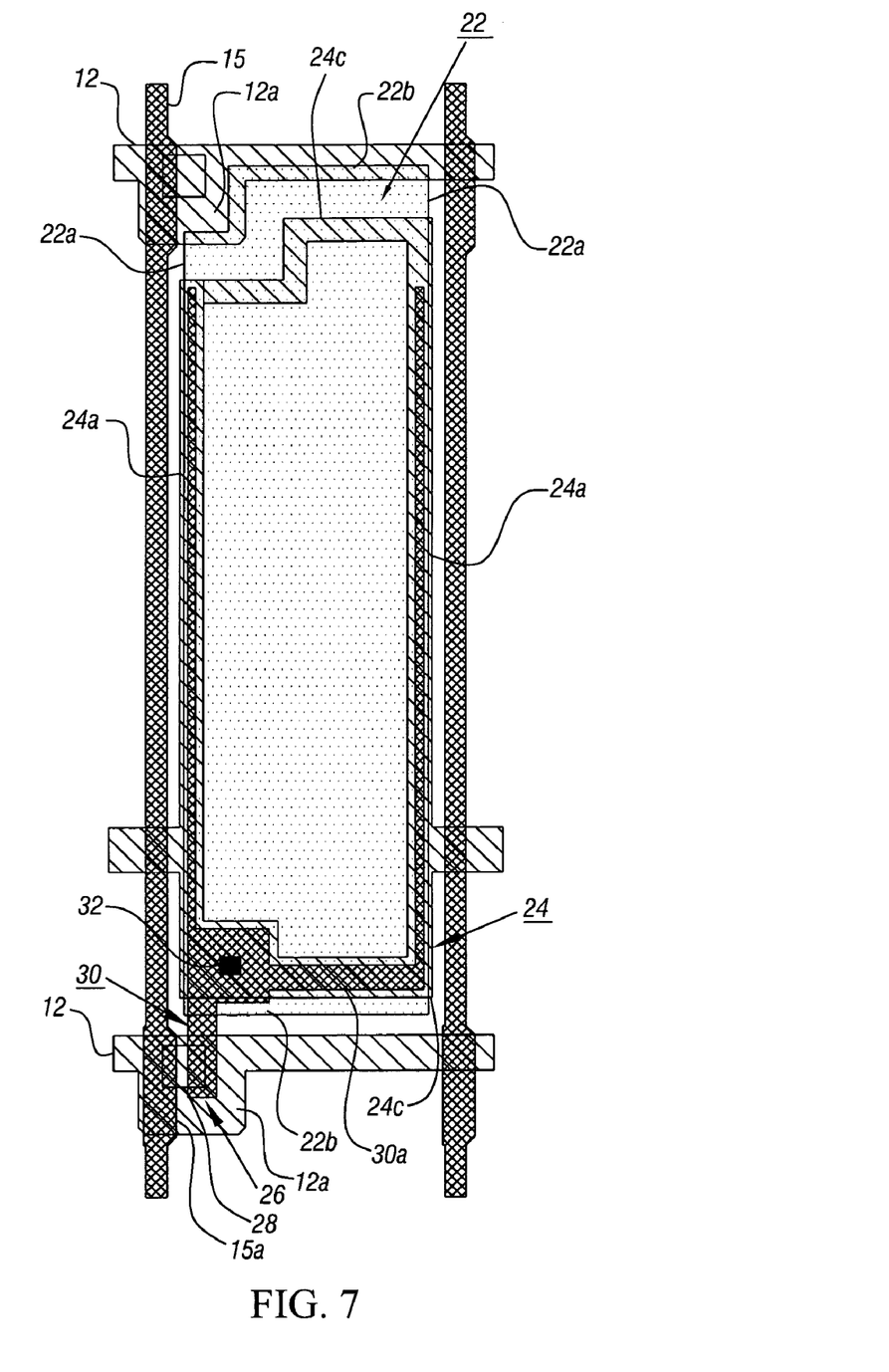

FIG. 7 shows the pixel layout of an LCD according to a further embodiment. The LCD of FIG. 7 is substantially identical to the LCD of FIG. 6 with the exception that the extending portion 30a of the drain electrode is generally U-shaped like the extending portion 30a of FIG. 5.

Figure 8:
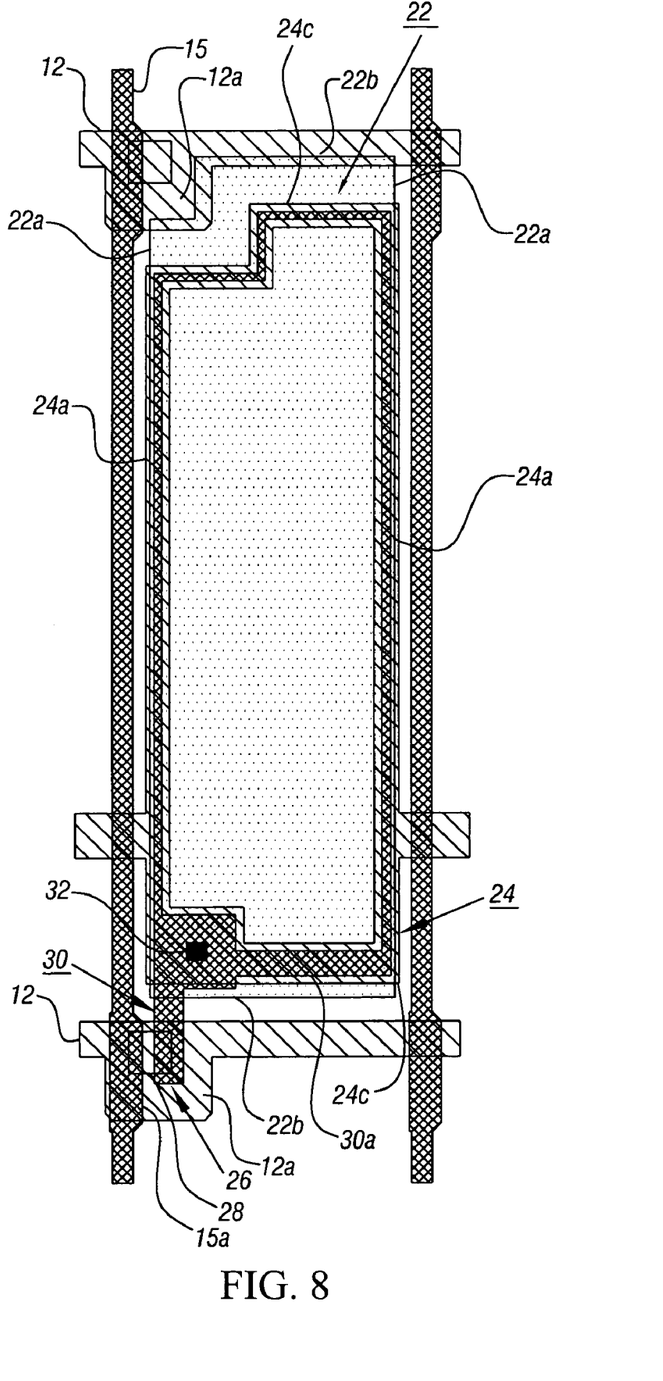

FIG. 8 shows the pixel layout of an LCD according to yet a further embodiment. The LCD of FIG. 8 is substantially identical to the LCD of FIG. 6 with the exception that the extending portion 30a of the drain electrode has a polygon shape that is substantially similar to the polygon shape of the capacitor electrode 24. The polygon sides of the extending portion 30a overlap respective side portions 24a and the connecting portions 24c of the capacitor electrode 24 to provide a larger supplemental storage capacitance.

Figure 9:
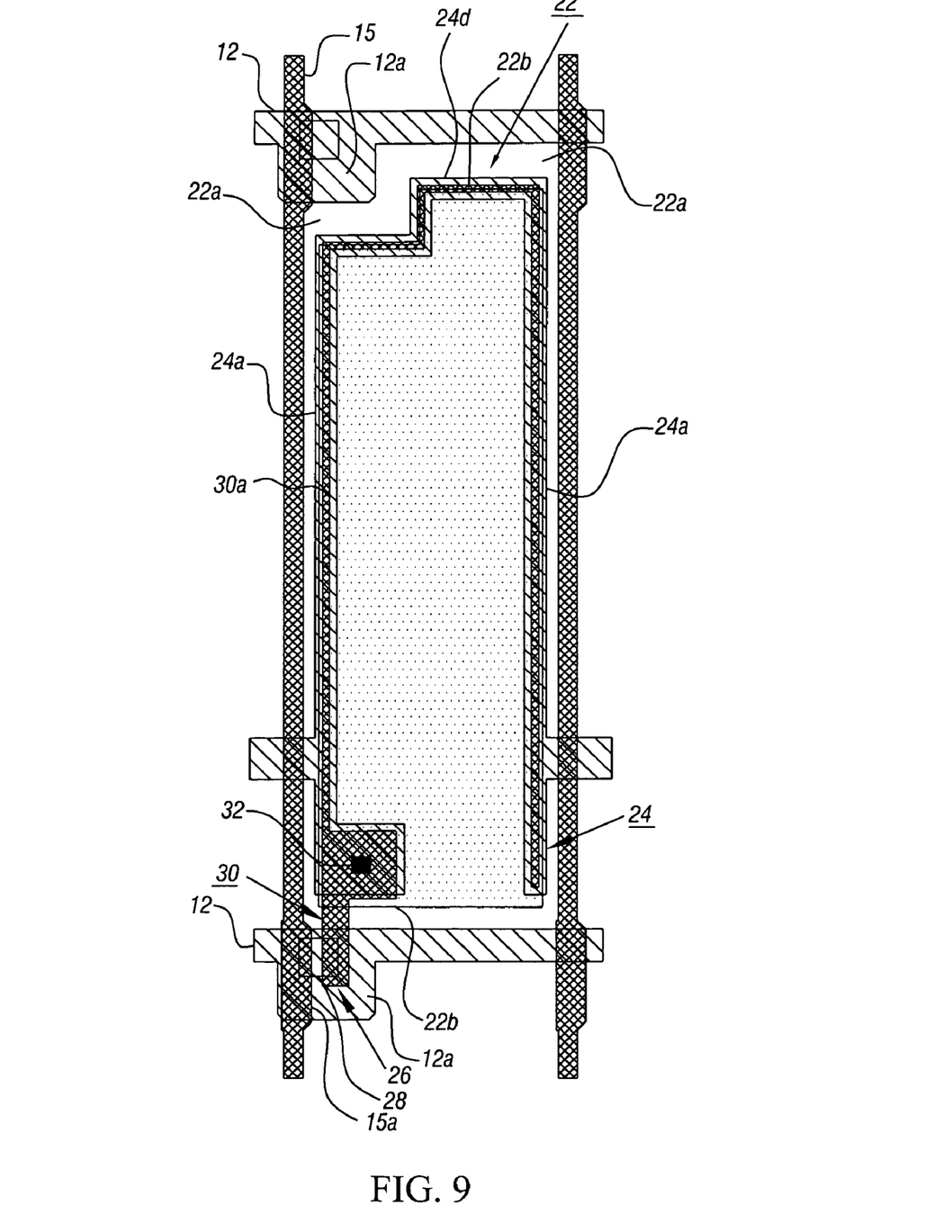

FIG. 9 shows the pixel layout of LCD according to another embodiment. The LCD of FIG. 9 is substantially identical to the LCD of FIG. 5 with the exception that the extending portion 30a of the drain electrode 30 and the capacitor electrode 24 each has an inverted general U-shape. The generally inverted U-shaped drain electrode extending portion 30a and capacitor electrode 24 overlap each other along the three segments of each of the drain electrode extending portion 30a and the capacitor electrode.

The capacitor electrode 24 of FIG. 9 has two side portions 24a interconnected by a central portion 24d. The central portion 24d of the capacitor electrode 24 has a generally serpentine shape with two horizontal sections interconnected by a vertical section. The extending portion 30a of the drain electrode has two side sections overlapping the side portions 24a of the capacitor electrode 24, and an upper section that overlaps the central portion 24d of the capacitor electrode 24 and has a general shape substantially similar to the shape of the central portion 24d.

As depicted in FIGS. 2-8, in each of the pixel regions, the gate line 12 and the gate electrode 12a, have portions overlapping corresponding second sides 22b of the pixel electrode 22, respectively, to provide extra storage capacitance. However, if the overall storage capacitance is already sufficient (it is typically desirable for the capacitance of the liquid crystal layer to be at least 0.8 times the capacitance provided by the capacitor electrode), overlapping of the gate line/gate electrode with the pixel electrode 22 would not have to be provided (for example, an embodiment without overlapping is shown in FIG. 9).

Moreover, the capacitor electrode 24 may be designed to have a loop shape as shown in FIGS. 6-8 or a general U-shape as shown in FIGS. 5 and 9, so that a connecting portion 24c (see FIGS. 6-8) or the central portion 24b or 24d (see FIGS. 5 and 9) of the capacitor electrode 24 can be used as an auxiliary light shielding layer for a second side 22b of the pixel electrode 22. Therefore, when it is not necessary to have an overlap between a second side 22b of the pixel electrode 22 with the gate line 12 and the gate electrode 12a within the a pixel region, the capacitor electrode 24 can be shaped to overlap greater portions of the pixel electrode 22 as depicted in FIGS. 5-9.

The method for manufacturing a TFT substrate (first substrate) according to an embodiment is described with reference to FIG. 2. First, a first metal layer is sputtered on a transparent substrate (such as a transparent glass substrate) to a predetermined thickness. The first metal layer may be a single-layer or multilayer opaque metal film formed from chromium (Cr), aluminum (Al), molybdenum (Mo) or aluminum-neodymium alloy, as examples. In one example embodiment, the first metal layer has a two-layer structure including a lower layer of aluminum-neodymium alloy and an upper layer of molybdenum that is formed by a sputtering process. Then, the first metal layer is etched by a photolithography process to form the gate line 12 and the capacitor electrode 24 described above.

Thereafter, an insulating layer is deposited on the entire surface of the substrate having the gate line 12 and the capacitor electrode 24 thereon to form a gate insulating layer (not shown). In one example embodiment, the insulating layer is made of SiNx that is formed by a plasma-enhanced chemical vapor deposition process.

Next, a semiconductor layer is formed on the gate insulating layer. The semiconductor layer in some embodiments includes an amorphous silicon layer and an ohmic contact layer such as an impurity-doped layer (e.g., n+ doped amorphous silicon layer).

After the semiconductor layer is patterned by a photolithography process, a second metal layer is formed on the entire surface of the gate insulating layer and the semiconductor pattern to a predetermined thickness. The second metal layer may have a single-layer or multilayer structure formed from Mo, Ti, Ta, W, Al, MoSi$_2$, TiSi$_2$, TaSi2, WSi$_2$, AlSi, AlCu, AlPd, AlNd or MoN, as examples. In one example embodiment, the second metal layer has a three-layer structure including a lower layer of MoN, a middle layer of Al, and an upper layer of MoN and is formed by a sputtering process. The second metal layer is then patterned by a photolithography process to form a second metal pattern including the data line 15, the source electrode 15a, and the drain electrode 30 described above.

A passivation layer (such as SiNx layer, not shown) is then formed on the entire surface of the above structure to a predetermined thickness. In one example embodiment, the passivation layer is made of SiNx and is formed by a plasma-enhanced chemical vapor deposition process. The passivation layer is then patterned to form a plurality of vias each exposing a potion of the drain electrode 30 using a photolithography process. After forming an indium-tin-oxide (ITO) layer as a transparent conductive layer on the entire surface of the structure having the passivation layer, the ITO layer is patterned by a photolithography process to form a plurality of pixel electrodes 22 on the passivation layer. Each of the pixel electrodes 22 is connected to the drain electrode 30 through one of the vias.

In sum, a method of manufacturing an LCD includes the steps of: (a) forming a first metal pattern including gate lines and capacitor electrodes on an insulating substrate; (b) depositing a gate insulating layer over the first metal pattern; (c) forming a semiconductor pattern on the gate insulating layer; (d) forming a second metal pattern including source and drain electrodes and data lines over the semiconductor pattern and the gate insulating layer, wherein the drain electrode has a portion extending along the extending direction of the gate line or the data line and overlapping at least a portion of the central portion of capacitor electrode; (e) forming a passivation layer covering the semiconductor pattern and the second metal pattern; (f) forming a plurality of vias in the passivation layer; and (g) forming a plurality of pixel electrodes on the passivation layer, wherein each of the pixel electrodes is electrically connected to the drain electrode through one of the vias.

In the LCD according to some embodiments, improved aperture ratio can be achieved. Also, extra or supplemental storage capacitance is provided by provision of an extended portion of each drain/source electrode and overlapping portions of each gate line/gate electrode with a respective pixel electrode. The extra or supplemental storage capacitance enables the capacitor electrode to be made smaller while a predetermined storage capacitance can still be obtained. Since the capacitor electrode is typically formed from an opaque conductive metal such as aluminum, chromium, tantalum or molybdenum, the design of some embodiments of the invention can further increase the aperture ratio of the LCD.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A display device comprising:
   a pixel region;
   a pixel electrode in the pixel region;
   a capacitor electrode having at least first and second segments, the first segment extending along a first direction with respect to the pixel electrode, and the second segment extending along a second direction with respect to the pixel electrode, the first direction angled with respect to the second direction; and
   a transistor having an electrode with an extending portion overlapping a portion of the pixel electrode and a substantial portion of at least one of the first and second segments of the capacitor electrode, wherein the extending portion is disposed within a boundary of the at least one of the first and second segments of the capacitor electrode,
   wherein the transistor electrode and the pixel electrode together provide a counter electrode to the capacitor electrode.

2. The display device of claim 1, further comprising:
   a first substrate and a second substrate;
   a liquid crystal layer sandwiched between the first and second substrates;
   a plurality of gate lines and data lines on the first substrate, wherein the pixel region is defined by a pair of the gate lines and the data lines, wherein the capacitor electrode is electrically isolated from the gate lines.

3. The display device of claim 1, wherein the extending portion of the transistor electrode and the pixel electrode form a first storage capacitance with the capacitor electrode, and the display device further comprises a second transistor having a gate electrode overlapping another portion of the pixel electrode such that the overlapping portion between the gate electrode and pixel electrode forms a second storage capacitance that is in addition to the first storage capacitance.

4. The display device of claim 3, further comprising a gate line electrically connected to the gate electrode, wherein a portion of the gate line also overlaps the pixel electrode, the overlapping of the gate line with the pixel electrode further contributing to the second storage capacitance.

5. The display device of claim 1, wherein the capacitor electrode is generally U-shaped and has a central segment and two side segments interconnected by the central segment, the two side segments of the generally U-shaped capacitor electrode respectively overlapping first sides of the pixel electrode, and the central segment of the generally U-shaped capacitor electrode extending along a second side of the pixel electrode.

6. The display device of claim 5, wherein the extending portion of the transistor electrode extends along the second side of the pixel electrode and overlaps the central segment of the generally U-shaped capacitor electrode.

7. The display device of claim 6, wherein the extending portion of the transistor electrode has a length substantially equal to a length of the second side of the pixel electrode.

8. The display device of claim 1, wherein the capacitor electrode is shaped as a polygon and has connecting segments and side segments interconnected by the connecting segments, the side segments of the capacitor electrode respectively overlapping first sides of the pixel electrode.

9. The display device of claim 8, wherein the extending portion of the transistor electrode extends along a second side of the pixel electrode and overlaps one of the connecting segments of the capacitor electrode.

10. The display device of claim 9, wherein the extending portion of the transistor electrode has a length substantially equal to the length of the second side of the pixel electrode.

11. The display device of claim 8, wherein the extending portion of the transistor electrode is generally U-shaped and overlaps the two side segments and one of the connecting segments of the capacitor electrode.

12. The display device of claim 8, wherein the extending portion of the transistor electrode is shaped generally as a polygon and substantially overlaps the polygon-shaped capacitor electrode.

13. The display device of claim 1, wherein the capacitor electrode is generally in the form of an inverted U-shape with a central segment and two side segments interconnected by the central segment, the two side segments of the generally inverted U-shaped capacitor electrode respectively overlapping first sides of the pixel electrode.

14. The display device of claim 1, further comprising:
   a first substrate on which are formed the pixel electrode, capacitor electrode, and the transistor; and
   a second substrate containing a light shielding layer,
   at least one segment of the capacitor electrode providing an auxiliary light shielding layer.

15. The display device of claim 14, wherein the auxiliary light shielding layer provided by the capacitor electrode segment enables narrowing of the light shielding layer of the second substrate.

16. The display device of claim 1, further comprising a plurality of gate lines and data lines that define additional pixel regions, the display device further comprising:

pixel electrodes in respective pixel regions, each pixel electrode having first sides adjacent to the data lines and second sides adjacent to the gate lines;

capacitor electrodes respectively disposed within respective pixel regions; and transistors in respective pixel regions, each transistor including a gate electrode, a semiconductor layer, a source electrode electrically connected to a respective data line and a drain electrode electrically connected to a respective pixel electrode, the drain electrode of each transistor having an extending portion extending along the first side or the second side of the respective pixel electrode and substantially overlapping at least a segment of a respective capacitor electrode, wherein the extending portion of each drain electrode and the respective pixel electrode together function as a counter electrode to the respective capacitor electrode.

17. The display device of claim 1, wherein the transistor comprises a thin film transistor.

18. A display device comprising:

a pixel region;

a pixel electrode in the pixel region;

a capacitor electrode having at least first and second segments, the first segment extending along a first direction with respect to the pixel electrode, and the second segment extending along a second direction with respect to the pixel electrode, the first direction angled with respect to the second direction; and a transistor having an electrode with an extending portion overlapping a portion of the pixel electrode and a substantial portion of at least one of the first and second segments of the capacitor electrode, wherein the transistor electrode and the pixel electrode together provide a counter electrode to the capacitor electrode, wherein the capacitor electrode is generally U-shaped and has a central segment and two side segments interconnected by the central segment, the two side segments of the generally U-shaped capacitor electrode respectively overlapping first sides of the pixel electrode, and the central segment of the generally U-shaped capacitor electrode extending along a second side of the pixel electrode, wherein the extending portion of the drain electrode is generally U-shaped to substantially overlap the generally U-shaped capacitor electrode.

19. A display device comprising:

a pixel region;

a pixel electrode in the pixel region;

a capacitor electrode having at least first and second segments, the first segment extending along a first direction with respect to the pixel electrode, and the second segment extending along a second direction with respect to the pixel electrode the first direction angled with respect to the second direction; and a transistor having an electrode with an extending portion overlapping a portion of the pixel electrode and a substantial portion of at least one of the first and second segments of the capacitor electrode, wherein the transistor electrode and the pixel electrode together provide a counter electrode to the capacitor electrode, wherein the capacitor electrode is generally in the form of an inverted U-shape with a central segment and two side segments interconnected by the central segment, the two side segments of the generally inverted U-shaped capacitor electrode respectively overlapping first sides of the pixel electrode, wherein the extending portion of the transistor electrode is generally in the form of an inverted U-shape, the extending portion overlapping respective side segments and the central segment of the generally inverted U-shaped capacitor electrode.

20. A thin film transistor substrate comprising:

a substrate having a plurality of gate lines and data lines, the gate lines and the data lines being arranged to form a matrix of pixel regions, wherein each of the pixel regions is bounded by two adjacent gate lines and two adjacent data lines, and wherein each pixel region contains:

a pixel electrode having first sides adjacent respective data lines and second sides adjacent respective gate lines;

a capacitor electrode; and a thin film transistor including a gate electrode, a semiconductor layer and source and drain electrodes, the drain electrode having a portion extending along the first side or the second side of the pixel electrode and substantially overlapping at least a segment of the capacitor electrode, wherein the extending portion has an outer boundary within a boundary of the segment of the capacitor electrode, wherein the extending portion of the drain electrode and the pixel electrode together function as a counter electrode to the capacitor electrode.

21. The thin film transistor of claim 20, wherein the drain electrode extending portion overlaps at least 50% of the segment of the capacitor electrode.

22. The thin film transistor substrate of claim 20, wherein the extending portion of the drain electrode and the pixel electrode form a first storage capacitance with the capacitor electrode, and, in each of the pixel regions, a gate electrode of another thin film transistor and a gate line overlap a corresponding second side of the pixel electrode to form a second storage capacitance with the pixel electrode.

23. The thin film transistor substrate of claim 20, wherein the capacitor electrode is generally in the form of a U-shape and has a central portion and two side portions interconnected by the central portion, the two side portions of the generally U-shaped capacitor electrode overlapping respective first sides of the pixel electrode, and the central portion of the generally U-shaped capacitor electrode extending along a corresponding second side of the pixel electrode.

24. The thin film transistor substrate of claim 23, wherein the extending portion of the drain electrode extends along a corresponding second side of the pixel electrode and overlaps the central portion of the generally U-shaped capacitor electrode.

25. The thin film transistor substrate of claim 24, wherein the extending portion of the drain electrode has a length substantially equal to the length of the corresponding second side of the pixel electrode.

26. The thin film transistor substrate of claim 20, wherein the capacitor electrode is generally in the form of a polygon and has two connecting portions and two side portions interconnected by the connecting portions, and the two side portions of each capacitor electrode respectively overlap the first sides of the pixel electrode.

27. The thin film transistor substrate of claim 26, wherein the extending portion of the drain electrode extends along a corresponding second side of the pixel electrode and overlaps the corresponding connecting portion of the capacitor electrode.

28. The thin film transistor substrate of claim 27, wherein the extending portion of the drain electrode has a length substantially equal to the length of the corresponding second side of the pixel electrode.

29. The thin film transistor substrate of claim 26, wherein the extending portion of the drain electrode generally has a U-shape and overlaps the two side portions and one connecting portion of the capacitor electrode.

30. The thin film transistor substrate of claim 20, wherein the capacitor electrode is generally in the form of an inverted U-shape and has a central portion and two side portions interconnected by the central portion, the two side portions of the generally inverted U-shaped capacitor electrode overlapping respective first sides of the pixel electrode.

31. The thin film transistor substrate of claim 30, wherein the extending portion of the drain electrode generally has an inverted U-shape and overlaps the two side portions and the central portion of the capacitor electrode.

32. The thin film transistor of claim 20, wherein the capacitor electrode of each pixel region is electrically isolated from the gate lines.

33. A thin film transistor substrate comprising:
a substrate having a plurality of gate lines and data lines, the gate lines and the data lines being arranged to form a matrix of pixel regions, wherein each of the pixel regions is bounded by two adjacent gate lines and two adjacent data lines, and wherein each pixel region contains:
a pixel electrode having first sides adjacent respective data lines and second sides adjacent respective gate lines;
a capacitor electrode; and
a thin film transistor including a gate electrode, a semiconductor layer and source and drain electrodes, the drain electrode having a portion extending along the first side or the second side of the pixel electrode and substantially overlapping at least a segment of the capacitor electrode,
wherein the extending portion of the drain electrode and the pixel electrode together function as a counter electrode to the capacitor electrode,
wherein the capacitor electrode is generally in the form of a U-shape and has a central portion and two side portions interconnected by the central portion, the two side portions of the generally U-shaped capacitor electrode overlapping respective first sides of the pixel electrode, and the central portion of the generally U-shaped capacitor electrode extending along a corresponding second side of the pixel electrode,
wherein the extending portion of the drain electrode generally has a U-shape and overlaps the two side portions and the central portion of the capacitor electrode.

34. A thin film transistor substrate comprising:
a substrate having a plurality of gate lines and data lines, the gate lines and the data lines being arranged to form a matrix of pixel regions, wherein each of the pixel regions is bounded by two adjacent gate lines and two adjacent data lines, and wherein each pixel region contains:
a pixel electrode having first sides adjacent respective data lines and second sides adjacent respective gate lines;
a capacitor electrode; and
a thin film transistor including a gate electrode, a semiconductor layer and source and drain electrodes, the drain electrode having a portion extending along the first side or the second side of the pixel electrode and substantially overlapping at least a segment of the capacitor electrode,
wherein the extending portion of the drain electrode and the pixel electrode together function as a counter electrode to the capacitor electrode,
wherein the capacitor electrode is generally in the form of a polygon and has two connecting portions and two side portions interconnected by the connecting portions, and the two side portions of each capacitor electrode respectively overlap the first sides of the pixel electrode,
wherein the extending portion of the drain electrode generally has a polygon shape and overlaps the two side portions and the two connecting portions of the capacitor electrode.

35. A method of manufacturing a substrate for a display device, comprising:
forming a first metal pattern including gate lines and capacitor electrodes on an insulating substrate;
depositing a gate insulating layer over the first metal pattern;
forming a semiconductor pattern on the gate insulating layer;
forming a second metal pattern including source and drain electrodes and data lines over the semiconductor pattern and the gate insulating layer, wherein each drain electrode has a portion extending along the extending direction of the respective gate line or data line, the extending portion substantially overlapping at least a segment of the respective capacitor electrode, wherein the extending portion has an outermost boundary that is within a boundary of the segment of the respective capacitor electrode;
forming a passivation layer covering the semiconductor pattern and the second metal pattern;
forming a plurality of vias in the passivation layer; and
forming a plurality of pixel electrodes on the passivation layer, wherein each of the pixel electrodes is connected to the respective drain electrode through at least one of the vias and has first sides adjacent respective data lines and second sides adjacent respective gate lines.

36. The method of claim 35, wherein the extending portion of each drain electrode and the respective pixel electrode form a first storage capacitance with the respective capacitor electrode, and a respective gate line has a portion overlapping a corresponding second side of the respective pixel electrode to form a second storage capacitance.

37. The method of claim 35, wherein forming the capacitor electrodes comprises forming generally U-shaped capacitor electrodes.

38. The method of claim 37, further comprising forming the extending portion of each drain electrode to a length substantially equal to the length of the corresponding second side of the respective pixel electrode.

39. The method of claim 35, wherein forming the capacitor electrodes comprises forming generally polygon-shaped capacitor electrodes.

40. The method of claim 39, further comprising forming the extending portion of each drain electrode to overlap plural segments of the respective capacitor electrode.

41. The method of claim 39, further comprising forming the extending portion of each drain electrode to be generally U-shaped and to overlap plural segments of the respective capacitor electrode.

42. The method of claim 39, further comprising forming the extending portion of each drain electrode to be generally polygon shaped and to overlap the respective generally polygon-shaped capacitor electrode.

43. The method of claim 35, wherein the capacitor electrodes are electrically isolated from the gate lines.

44. A method of manufacturing a substrate for a display device, comprising:

forming a first metal pattern including gate lines and capacitor electrodes on an insulating substrate;

depositing a gate insulating layer over the first metal pattern;

forming a semiconductor pattern on the gate insulating layer;

forming a second metal pattern including source and drain electrodes and data lines over the semiconductor pattern and the gate insulating layer, wherein each drain electrode has a portion extending along the extending direction of the respective gate line or data line, the extending portion substantially overlapping at least a segment of the respective capacitor electrode;

forming a passivation layer covering the semiconductor pattern and the second metal pattern;

forming a plurality of vias in the passivation layer;

forming a plurality of pixel electrodes on the passivation layer, wherein each of the pixel electrodes is connected to the respective drain electrode through at least one of the vias and has first sides adjacent respective data lines and second sides adjacent respective gate lines, wherein forming the capacitor electrodes comprises forming generally U-shaped capacitor electrodes; and forming the extending portion of each drain electrode to be generally U-shaped and to overlap the respective generally U-shaped capacitor electrode.

* * * * *